United States Patent [19]

Inaba et al.

[11] Patent Number: 5,370,932
[45] Date of Patent: Dec. 6, 1994

[54] MAGNETIC RECORDING MEDIUM

[75] Inventors: Hiroo Inaba; Masatoshi Takahashi; Kazuaki Taga; Keiji Mori, all of Kanagawa, Japan

[73] Assignee: Fuji Photo Film Co., Ltd., Kanagawa, Japan

[21] Appl. No.: 15,293

[22] Filed: Feb. 8, 1993

Related U.S. Application Data

[63] Continuation of Ser. No. 645,869, Jan. 25, 1991, abandoned.

[30] Foreign Application Priority Data

Jan. 25, 1990 [JP] Japan ................ 2-15793

[51] Int. Cl.⁵ .................. B32B 5/16; G11B 5/66
[52] U.S. Cl. ........................ 428/323; 428/329; 428/336; 428/678; 428/694 B; 428/694 BG; 428/694 BN; 428/694 BA; 428/694 BM; 428/694 BP; 428/694 BU
[58] Field of Search ............ 428/323, 678, 329, 336, 428/900, 694 BM, 694 B, 694 BP, 694 BN, 694 BA, 694 BG, 694 BU

[56] References Cited

U.S. PATENT DOCUMENTS

| | | |
|---|---|---|
| 4,367,263 | 1/1983 | Kawahara et al. ............ 428/336 |
| 4,624,883 | 11/1986 | Yamaguchi et al. ............ 428/212 |
| 4,980,230 | 12/1990 | Saito et al. | |
| 4,992,330 | 2/1991 | Kawahara et al. ............ 428/329 |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A magnetic recording medium excellent in electromagnetic properties is disclosed, which comprises a non-magnetic support and at least two magnetic layers formed thereon, each of which is mainly composed of a magnetic substance and a binder, in which a first magnetic layer (a lower layer) has a coercive force of 450 to 660 Oe, a residual magnetic flux density (Br) of 1,950 gausses or more and a thickness of 1.5 to 5 μm, a second magnetic layer (an upper layer) has a coercive force of 700 to 900 Oe, a residual magnetic flux density of 1,500 gausses or more and a thickness of 1.5 to 3 μm, the difference in coercive force between the first magnetic layer and the second magnetic layer is 150 to less than 300 Oe, the difference in residual magnetic flux density between the first magnetic layer and the second magnetic layer is within 600 gausses, and the total thickness of magnetic layers on the non-magnetic support is 3 to 7 μm.

14 Claims, 3 Drawing Sheets

MAGNETIC RECORDING MEDIUM

This is a continuation of application Ser. No. 07/645,869, filed Jan. 25, 1991, now abandoned.

FIELD OF THE INVENTION

The present invention relates to a magnetic recording medium having plural magnetic layers having excellent electromagnetic properties.

BACKGROUND OF THE INVENTION

It is a conventional technique to use plural magnetic layers in order to improve the electromagnetic properties of magnetic recording media. The plural magnetic layers make it possible to differentiate the coercive force, the residual magnetic flux density and the magnetic particle size (represented by the crystallite size or the specific surface area) of the upper magnetic layer from those of the lower magnetic layer. The electromagnetic properties can therefore be enhanced by an improvement in outputs over a wide frequency range.

In recent years, audio cassette tapes have also undergone remarkable development with one object being to increase the densification thereof. Also, many proposals have been advanced with objects being to equalize the outputs over the wide frequency range by using the plural magnetic layers as described above and aiming at attaining higher sound quality. For example, these proposals are disclosed in JP-B-37-2218 (the term "JP-B" as used herein means an "examined Japanese patent publication"), JP-B-40-5351, JP-B-54-8286, JP-B-52-28364, JP-B-58-100, JP-A-58-56230 (the term "JP-A" as used herein means an "unexamined published Japanese patent application") and U.S. Pat. No. 3,761,311.

Recently, 160% bias high position audio cassette tapes have attained commercial acceptance along side the conventional 100% bias normal position tapes. Examples of the former are disclosed in JP-A-58-56228, JP-A-54-21304, JP-A-54-48504, JP-A-57-33435 and U.S. Pat. No. 4,109,046. In these references, tape features are described such as the coercive force, the magnetic particle specific surface area and the residual magnetic flux density of a first magnetic layer and a second magnetic layer. Also, many descriptions therein are directed to the enlargement of the dynamic range of high and low tones. These references also include an improvement of a so-called slump in a middle tone range. However, it has become clear that these manipulations alone are insufficient to achieve high sound quality and are utterly insufficient in MOL characteristic at 10 kHz for so-called 3-head decks.

Specifically, JP-A-54-48504 proposes a magnetic recording medium comprising a second magnetic layer having a coercive force of 590 to 800 Oe and a residual magnetic flux density of 1,200 gausses or more, and a first layer having a coercive force of 400 to 560 Oe, but the residual magnetic flux density is not described for the first layer.

U.S. Pat. No. 4,423,453 further proposes a magnetic recording medium comprising a second magnetic layer having a coercive force of 590 to 800 Oe and a thickness of 2.1 μm or more, and a first magnetic layer having a coercive force of 400 to 590 Oe and a thickness of 2.1 to 2.8 μm.

Figure 5:
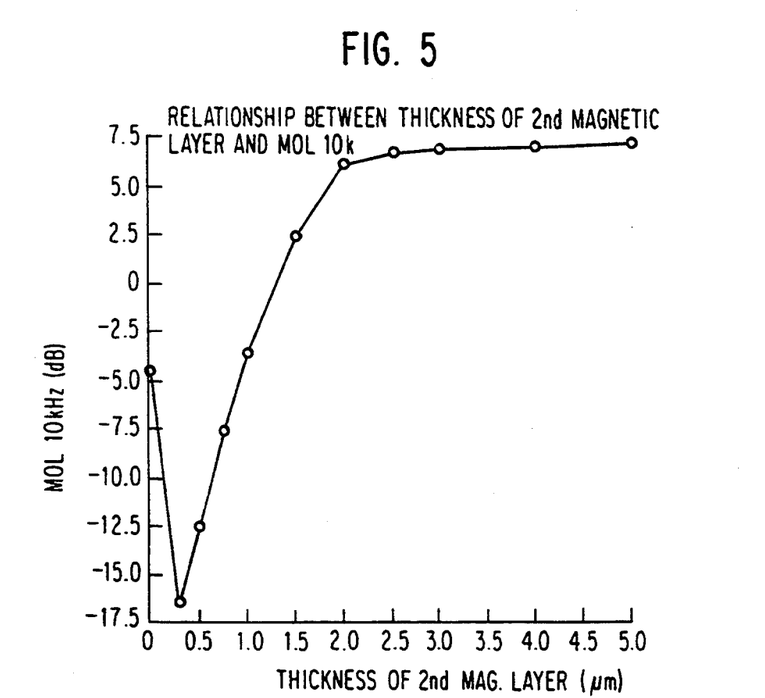
FIG. 5 is a graph showing the relationship between the thickness of the second magnetic layer and the MOL 10 k.

In the above-described prior art approaches, the coercive force of the upper and lower layers could be differentiated only to a limited degree to improve a drop, the so-called slump, in frequency characteristics in the middle tone range, which causes the restriction on the enlargement of the dynamic range of high and low tones. Further, in a so-called 3-head recording deck in which recording heads are independently arranged, it was discovered that the MOL characteristic at 10 kHz was dramatically reduced with decreasing thickness of the second layer. This phenomenon is shown in FIG. 5. In a 2-head recording deck, the tendency of the MOL characteristic at 10 kHz to be reduced was not observed. However, in the 3-head recording deck, it was ascertained that the thin second magnetic layer reduced the MOL characteristic at 10 kHz, which resulted in deterioration in sound quality. The present inventors have conducted intensive studies in an effort to solve the problems of slump in the middle tone range and reduction in MOL characteristic at 10 kHz.

SUMMARY OF THE INVENTION

Therefore, an object of the present invention is to provide a magnetic recording medium excellent in electromagnetic properties, and particularly a magnetic recording medium in which the MOL characteristic of a low tone, at 315 Hz (hereinafter referred to as MOL 315), is improved, while improving the MOL characteristic at 10 kHz (hereinafter referred to as MOL 10k), in a 3-head deck, and in which a drop in frequency characteristics in a middle tone range known as a so-called slump is diminished.

Namely, the present invention provides a magnetic recording medium comprising a non-magnetic support, and at least two magnetic layers formed thereon, each of which is mainly composed of a magnetic substance and a binder, in which a first magnetic layer (a lower layer) has a coercive force (Hc) of 450 to 660 Oe, a residual magnetic flux density (Br) of 1,950 gausses or more and a thickness of 1.5 to 5 μm, a second magnetic layer (an upper layer) has a coercive force of 700 to 900 Oe, a residual magnetic flux density of 1,500 gausses or more and a thickness of 1.5 to 3 μm, the difference in coercive force between the first magnetic layer and the second magnetic layer is 150 to less than 300 Oe, the difference in residual magnetic flux density between the first magnetic layer and the second magnetic layer is within 600 gausses, and the total thickness of magnetic layers (including not only the first and second magnetic layers but also another magnetic layer(s) if any) provided on the non-magnetic support is 3 to 7 μm.

DETAILED DESCRIPTION OF THE INVENTION

In high position audio cassette tapes, it is preferred that the coercive force of the upper magnetic layer is 700 to 900 Oe. Previously, the MOL 10 k had a tendency to be improved with an increase in total coercive force of the magnetic layer structure, and on the contrary, the MOL 315 had a tendency to be improved with a decrease in coercive force. In the present invention, the coercive force of the lower magnetic layer is defined to 450 to 660 Oe to adjust the total coercive force to a suitable value, and the difference in coercive force between the upper magnetic layer and the lower magnetic layer is defined to 150 to less than 300 Oe, whereby the MOL 10 k and the MOL 315 can be well balanced. If the difference in coercive force exceeds the above range, the phenomenon occurs that lines of magnetic force are refracted in the interface of the upper magnetic layer and the lower magnetic layer, which causes the magnetic characteristics to deteriorate. On the other hand, if this difference is below the above range, the multilayer effect can not be obtained and the MOL 10 k decreases.

Also, the residual magnetic flux density of the upper magnetic layer is defined to at least 1,500 gausses and that of the lower magnetic layer is defined to at least 1,950 gausses, whereby the MOL 10 k and the MOL 315 are well balanced. If the residual magnetic flux density of the upper magnetic layer is less than 1,500 gausses, the MOL 10 k decreases. The total coercive force and residual magnetic flux density of the magnetic layer structure affect the MOL 315, and the balance is lost without the above range.

If the thickness of the upper magnetic layer is less than 1.5 $\mu$m, the total coercive force decreases and the MOL 315 increases, but the MOL 10 k decreases. On the other hand, if the thickness of the lower magnetic layer is less than 1.5 $\mu$m, the MOL 315 decreases.

Thus, according to the present invention, the conflicting characteristics, the MOL 10 k and the MOL 315, can be highly balanced by controlling the coercive force, the residual magnetic flux density and the thicknesses of the upper magnetic layer and the lower magnetic layer, and the various differences therebetween for these properties.

There is no difficulty in producing the first and second magnetic layers having the above defined coercive forces. The coercive force can be easily adjusted in a conventional manner, for example, by controlling acicular ratios of magnetic substances to be used, calcination conditions of the magnetic substances, the degree of adsorption of Co on the magnetic substances and the like. For adjustment of the coercive force, reference may be made to Y. Kubota et al, *IEEE TRANSACTIONS OF MAGNETICS*, VOL. MAG-15, No. 6, (November 1979), M. Kishimoto et al, *J. Appl. Phys.* 50(1), (January 1979), and S. Umemura et al, *FERRITES*, Proceedings of International Conferences, September–October 1980, Japan, p.p. 633.

On the other hand, there are some difficulties in maintaining the residual magnetic flux density of the first magnetic layer at 1,950 gausses or more when the first magnetic layer contains a thermosetting binder component. The most difficult manufacturing problem in the case is a pot life problem. Previously, in order to form the multilayer structure by a successive multilayer coating method, it was required to add a thermosetting binder component such as an isocyanate to harden the first magnetic layer before the subsequent coating of the second magnetic layer so as to prevent diffusion of a solvent in the coating composition for the second magnetic layer into the first magnetic layer resulting in mixing of the two magnetic layers. For this reason, even if the first magnetic layer had a residual magnetic flux density of 1,950 gausses prior to addition of the thermosetting binder component, it was impossible to keep the residual magnetic flux density at 1,950 or more because a hardening reaction was initiated by addition of the thermosetting binder component and, as a consequence, the magnetic substance then significantly aggregated. According to the present invention, the present inventors have discovered that it is possible to keep the residual magnetic flux density at 1,950 gausses or more relatively easily by the operation of adding a polyisocyanate as a thermosetting binder component to the second magnetic layer which is relatively lower in residual magnetic flux density.

Further, a problem in coating can be solved by employing the simultaneous multilayer coating method in which the second magnetic layer is applied while the first magnetic layer is still in a wet state, whereby mixing of the two magnetic layers can be prevented even without addition of the thermosetting binder component in the first magnetic layer. According to the simultaneous multilayer coating method, the thermosetting binder component needs not be added in the second magnetic layer, either. In the case, however, the physical strength of the second magnetic layer has to be enchanced by way of, for example, adjustment of the particle size of magnetic substances used and the amount of abrasive agents added.

Preferred embodiments of the present invention are as follows:

(1) A magnetic recording medium in which the first magnetic layer contains carbon black having a primary particle size of at least 20 $\mu$m and containing volatiles of 10% by weight or less, in an amount of 1 to 20 parts by weight per 100 parts by weight of the magnetic substance in the first magnetic layer.

(2) A magnetic recording medium in which the first magnetic layer does not contain carbon black.

(3) A magnetic recording medium in which the thickness of the first magnetic layer is 1.5 to 5 $\mu$m, and preferably 2 to less than 4 $\mu$m.

(4) A magnetic recording medium in which the thickness of the second magnetic layer is preferably 1.5 to 3 $\mu$m, and more preferably 1.7 to less than 2.6 $\mu$m. If the thickness of the upper layer exceeds 3 $\mu$m, the running durability becomes unstable.

(5) A magnetic recording medium in which the magnetic substance contained in the first magnetic layer preferably has a specific surface area of 40 m$^2$/g or less which is measured by the BET method and a crystallite size of 210 angstroms or more, and more preferably has a specific surface area of 35 m$^2$/g or less and a crystallite size of 250 angstroms or more.

(6) A magnetic recording medium in which the magnetic substance contained in the second magnetic layer preferably has a specific surface area of 35 m$^2$/g or more which is measured by the BET method and a crystallite size of 350 angstroms or less, and more preferably has a specific surface area of 40 m²/g or more and a crystallite size of 210 angstroms or more.

(7) A magnetic recording medium which was obtained by applying the second magnetic layer while the first magnetic layer is in a wet state after application thereof.

When represented by the specific surface area measured by the BET method, the specific surface area of magnetic particles of the second magnetic layer according to the present invention is generally 25 to 80 m²/g, and preferably 35 to 60 m²/g. If the specific surface area is less than 25 m²/g, noises are unfavorably elevated and if it exceeds 80 m²/g, the desired surface properties are unfavorably difficult to obtain. The magnetic particles contained in the second magnetic layer according to the present invention generally have a crystallite size of 450 to 100 angstroms, and preferably 350 to 150 angstroms. On the other hand, with respect to the characteristics of the magnetic particles contained in the first magnetic layer according to the present invention, other than the coercive force thereof, it is preferred that the particle size (major axis) and the crystalline size are larger than those of the magnetic particles contained in the second magnetic layer and that the specific surface area is smaller than that of the magnetic particles contained in the second magnetic layer, because the magnetic particles are generally easily dispersed, whereby the excellent surface properties are obtained.

When the magnetic characteristics of the magnetic recording medium of the present invention are measured in a magnetic field of 5 KOe, the squareness ratio of the second magnetic layer in the running direction (longitudinal direction) of the tape is generally 0.70 or more, preferably 0.80 or more, and more preferably 0.90 or more. The squareness ratio of the first magnetic layer may be smaller than that of the second magnetic layer, but it is generally 0.70 or more, preferably 0.80 or more.

The squareness ratio of the first magnetic layer and the second magnetic layer in the width direction, i.e., the direction perpendicular to the running direction, respectively, of the tape is preferably not more than 80% of the squareness ratio in the running direction of the tape.

The switching field distribution (SFD) of the first magnetic layer may be larger than that of the second magnetic layer, but neither is preferably more than 0.6. The SFD indicates the distribution of the coercive force contained in the magnetic layer due to reversed magnetic fields, and is represented by a value obtained by dividing a half width of a differential curve of a magnetic hysteresis curve at the magnetic field of 5 KOe by the coercive force.

The saturation magnetization ($\sigma s$) of the magnetic substance contained in the second magnetic layer is generally at least 50 emu/g, and preferably at least 70 emu/g. In the case of fine ferromagnetic metal powders, it is preferably at least 100 emu/g. The saturation magnetization ($\sigma s$) of the magnetic substance contained in the first magnetic layer may be smaller than that of the second magnetic layer, but it is preferably 50 emu/g or more.

For both of the first magnetic layer and the second magnetic layer, the water content of the magnetic substance(s) is preferably 0.01 to 2% by weight. It is preferred that the water content of the magnetic substances is optimized depending on the type of binder it co-exists with in the magnetic layer. The water content is measured with Karl Fischer's method and is calculated by the following equation.

$$\text{Water content (\% by weight)} = \frac{W}{Mag + W} \times 100$$

W: Amount of water contained in the magnetic substance

Mag: Amount of the magnetic substance

The tap density of the magnetic substance contained in the second magnetic layer is preferably 0.5 g/ml or more, and more preferably 0.8 g/ml or more. The tap density of the magnetic substance contained in the first magnetic layer may be lower than that of the magnetic substance contained in the second magnetic layer, but it is preferably 0.6 g/ml or more.

The tap density is measured by the following manner: 40 g of a measured powder is weighed and placed in a messcylinder which is then tapped (dropped) 100 times from 30 cm-high position, and it is calculared from the volume of the powder in the messcylinder by the following equation.

Tap density (g/ml)=40/the measured volume of the powder

When the magnetic substance contained in the first magnetic layer is formed of cobalt-containing iron oxide, the ratio of divalent iron to trivalent iron is preferably 0 to 20 atomic %, and more preferably 5 to 10 atomic %. The amount of cobalt is generally 0 to 15 atomic % based on the amount of iron, and preferably 3 to 8 atomic %.

It is preferred that the pH of the magnetic substance(s) contained in the first magnetic layer and the second magnetic layer is optimized depending on the binders used in combination therewith. The range thereof is generally 4 to 12, and preferably 6 to 10.

At least one of the magnetic substances contained in the first magnetic layer and the second magnetic layer may be surface treated with Al, Si, P or oxides thereof if desired. The amount of surface treatment agent is 0.1 to 10% by weight based on the magnetic substance. The adsorption amount of lubricants such as fatty acids can desirably be reduced to 100 mg/m² or less by the surface treatment.

In some cases, both the magnetic substances of the first magnetic layer and the second magnetic layer contain inorganic ions such as soluble Na, Ca, Fe, Ni and Sr. However, they do not particularly affect the characteristics as long as their content is not more than 500 ppm.

The magnetic substances which can be used in the first magnetic layer and the second magnetic layer in the present invention include conventional ferromagnetic powders such as $\gamma$-FeO$_x$ (x=1.33 to 1.5), Co-containing $\gamma$-FeO$_x$ (x=1.33 to 1.5), a finely divided ferromagnetic alloy mainly containing at least 75 atomic % of Fe, Ni or Co, barium ferrite and strontium ferrite. These ferromagnetic powders may contain atoms of elements such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pt, Nd, P, Co, Mn, Zn, Ni, Sr and B, in addition to the above-mentioned elemental atoms.

These ferromagnetic powders can be previously treated with dispersants, lubricating agents, surface active agents, antistatic agents or the like which will hereinafter be described, prior to their dispersion.

Of the above-described ferromagnetic powders, the finely divided ferromagnetic alloys may contain small amounts of hydroxides or oxides. The finely divided ferromagnetic alloys as obtained by conventional methods can be used, which include a method in which a complex organic acid salt (mainly an oxalic acid salt) is reduced with a reducing gas such as hydrogen; a method in which iron oxide is reduced with a reducing gas such as hydrogen to obtain Fe or Fe—Co particles; a method in which a metal carbonyl compound is thermally decomposed; a method in which a reducing agent such as sodium borohydride, a hypophosphite or hydrazine is added to an aqueous solution of a ferromagnetic metal compound to conduct reduction; and a method in which a metal is evaporated in a low-pressure inert gas to obtain a fine powder.

The finely divided ferromagnetic alloys thus obtained may be gradually oxidized by methods known in the art such as a method in which the ferromagnetic alloy is immersed in an organic solvent, followed by drying; a method in which ferromagnetic alloy is immersed in an organic solvent and then an oxygen-containing gas is introduced therein, followed by drying; and a method in which the partial pressures of an oxygen gas and an inert gas are controlled to form oxide films on the surfaces of the particles, not using an organic solvent.

It is preferred that the magnetic substance used in the present invention has few voids. The percentage of voids is preferably 20% by volume or less, and more preferably 5% by volume or less.

The magnetic substances used in the present invention can be produced by conventional methods. The shape thereof may be any of acicular, granular, ellipsoidal and plate-like shapes, as long as the above-described requirements for particle size are satisfied.

In order to attain the SFD of 0.6 or less in the second magnetic layer according to the present invention, it is necessary to minimize the coercive force distribution of the magnetic substance. For this purpose, there is employed the method of improving the size distribution of goethite, the method of preventing γ-hematite from sintering, or the method of slowing down the adhering rate of cobalt compared to the conventional rate for Co-containing iron oxide.

As the binders used in the present invention, conventional thermoplastic resins, thermosetting resins, reactive resins and mixtures thereof are used in both of the first magnetic layer and the second magnetic layer.

As the thermoplastic resins, resins are used having a glass transition temperature of −100 to 150° C., an average number molecular weight of 1,000 to 200,000, preferably 10,000 to 100,000 and a degree of polymerization of about 50 to 1,000.

Examples of such resins include polymers and copolymers containing vinyl chloride, vinyl acetate, vinyl alcohol, maleic acid, acrylic acid, an acrylate, vinylidene chloride, acrylonitrile, methacrylic acid, a methacrylate, styrene, butadiene, ethylene, vinyl butyral, vinyl acetal and vinyl ether as a structure unit; polyurethane resins; and various rubber type resins.

The thermosetting resins or reactive resins include phenolic resins, epoxy resins, curable-type polyurethane resins, urea resins, melamine resins, alkyd resins, reactive acrylic resins, formaldehyde resins, silicone resins, epoxypolyamide resins, mixtures of polyester resins and isocyanate prepolymers, mixtures of polyester polyols and polyisocyanates and mixtures of polyurethanes and polyisocyanates.

These resins are described in detail in "*Plastic Handbook*" published by Asakura Shoten, Japan.

It is also possible to use known resins of an electron beam hardening type for the first magnetic layer or the second magnetic layer. Examples of these resins and methods for producing them are described in detail in JP-A-62-256219.

The resins described above can be used alone or in combinations thereof. Preferred examples include combinations of resins of at least one kind selected from the group consisting of vinyl chloride resins, vinyl chloride-vinyl acetate resins, vinyl chloride-vinyl acetate-vinyl alcohol resins and vinyl chloride-vinyl acetate-maleic anhydride copolymers, with polyurethane resins, and combinations of these combined resins with further polyisocyanate resins.

Conventional polyurethane resins can be used such as polyesterpolyurethanes, polyetherpolyurethanes, polyetherpolyesterpolyurethanes, polycarbonatepolyurethane, polyesterpolycarbonatepolyurethanes and polycaproiactonepolyurethanes.

For all of the binders described herein, in order to obtain more excellent dispersibility and durability, it is preferred to use the binder in which at least one polar group selected from the group consisting of —COOM, —$SO_3M$, —$OSO_3M$, —P=$O(OM)_2$, —O—P=$O(OM)_2$ (wherein M represents a hydrogen atom, an alkali metal or ammonium), —OH, —$NR_2$, $N^{+}R_3$ (wherein R represents a hydrocarbon group such as methyl, ethyl, etc.), an epoxy group, —SH and —CN is introduced by copolymerization or addition reaction if desired. The preferred amount of such a polar group is $1\times10^{-1}$ to $1\times10^{-8}$ mol/g binder and more preferably $1\times10^{-2}$ to $1\times10^{-6}$ mol/g binder.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE (which are manufactured by Union Carbide Co., Ltd.); MPR-TA, MPR-TA5, MPR-TAL, MPR-TSN, MPR-TMF, MPR-TS and MPR-TM (which are manufactured by Nissin Chemical Industry Co., Ltd.); 100 OW, DX80, DX81, DX82 and DX83 (which are manufactured by Denki Kagaku Co., Ltd.); MR110, MR100 and 400X110A (which are manufactured by Nippon Zeon Co., Ltd.); Nipporan N2301, N2302 and N2304 (which are manufactured by Nippon Polyurethane Co., Ltd.); Pandex T-5105, T-R3080 and T-5201, Burnock D-400 and D-210-80, and Crisvon 6109 and 7209 (which are manufactured by Dainippon Ink and Chemicals, Inc.); Vylon UR8200, UR8300, RV530 and RV280 (which are manufactured by Toyobo Co., Ltd.); Daipheramin 4020, 5020, 5100, 5300, 9020, 9022 and 7020 (which are manufactured by Dainichiseika Co., Ltd.); MX5004 (which is manufactured by Mitsubishi Kasei Corp.); Sunprene SP-150 (which is manufactured by Sanyo Chemical Industries Co., Ltd.); and Salan F310 and F210 (which are manufactured by Asahi Chemical Industry Co., Ltd.).

When the binder is used in the first magnetic layer and the second magnetic layer in the present invention, the binder is used in an amount of 5 to 50% by weight, preferably 10 to 30% by weight based on the magnetic substance contained in each magnetic layer. When a vinyl chloride resin is used, it is preferably used in an amount of 5 to 30%. When a polyurethane resin is used, it is preferably used in an amount of 2 to 20% by weight. When a polyisocyanate resin is used, it is preferably used in an amount of 2 to 20% by weight. These three types of resins are preferably used in combination.

When the polyurethane resins are used in the present invention, there are preferably used polyurethane resins having a glass transition temperature of −50 to 100° C., a breaking elongation of 100 to 2,000%, a breaking stress of 0.05 to 10 kg/cm$^2$ and a yield point of 0.05 to 10 kg/cm$^2$.

The magnetic recording medium of the present invention comprises two magnetic layers. It is therefore possible, of course, to vary many parameters between the first magnetic layer and the second magnetic layer, such as the amount of the binder, the amount of the vinyl chloride resin, the polyurethane resin, the polyisocyanate resin or the other resins contained in the binder, the molecular weight or the amount of the polar groups of each resin forming the magnetic layers, and the physical characteristics of the above-described resins.

The thermosetting binder components used in the present invention are those capable of undergoing a hardening reaction in the magnetic layer, such as polyisocyanates. The polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohols; and polyisocyanates formed by condensation of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.); Takenate D-102, Takenate D-110N, Takenate 200 and Takenate D-202 (manufactured by Takeda Chemical Industries, Ltd.); and Desmodule L, Desmodule IL. Desmodule N and Desmodule HL (manufactured by Sumitomo Bayer Co., Ltd.). These polyisocyanates can be used alone or in combinations of two or more thereof in both of the first magnetic layer and the second magnetic layer, utilizing the difference in hardening reactivity.

Examples of carbon black used in the present invention include furnace black for rubbers, thermal black for rubbers, black for coloring and acetylene black. It is preferred that the carbon black has a specific surface area of 5 to 500 m$^2$/g, an oil adsorption as measured by the DBP method of 10 to 400 ml/100 g, a particle size of 5 to 300 μm, a pH of 2 to 10, a water content of 0.1 to 10% by weight and a tap density of 0.1 to 1 g/ml.

Specific examples of the carbon black used in the present invention include BLACKPEARLS 2,000, 1,300, 1,000, 900, 800 and 700, and VULCAN XC-72 (manufactured by Cabot); #80, #60, #55, #50 and #35 (manufactured by Asahi Carbon Co., Ltd.); #2400B, #2300, #900, #1,000, #30, #40 and #10B (manufactured by Mitsubishi Kasei Corp.); and CONDUCTEX SC, RAVEN 150, 50, 40 and 15 (manufactured by Colombia Carbon). The carbon black may be used which is surface treated with a dispersing agent, which is grafted with a resin, or whose surface is partly graphitized. Further, the carbon black may be previously dispersed with a binder before its addition to a magnetic coating composition.

The carbon black can be used alone or in combinations thereof in both of the first magnetic layer and the second magnetic layer. When the carbon black is used, it is preferably used in an amount of 0.1 to 30% by weight based on the magnetic substance in both of the first magnetic layer and the second magnetic layer.

The carbon black imparts antistatic property to the magnetic layers, serves to reduce the coefficient of friction, and acts to give shading property and to improve film strength. These functions vary depending on the type of carbon black used. It is therefore possible, of course, that the carbon black used in the first magnetic layer and the second magnetic layer can be independently selected by changing the kind, amount and combination of the carbon black, based on various characteristics described above such as particle size, oil absorption, electric conductivity and pH, according to the purpose sought. For example, carbon black which is high in electric conductivity is incorporated in the first magnetic layer to prevent electric charge, and carbon black which is large in particle size is incorporated in the second layer reduce the coefficient of friction.

For the carbon black which can be used in the present invention, reference can be made, for example, to "*Handbook Carbon Black*" edited by Carbon Black Association.

In the present invention, as abrasive agents, conventional agents having a Mohs' hardness of at least 6 are mainly used alone or in combination, such as alumina, particularly α-alumina having an α-conversion ratio of 90% or more, β-alumina, silicon carbide, chromium oxide, cerium oxide, α-iron oxide, corundum, artificial diamond, silicon nitride, silicon carbide-titanium carbide, titanium oxide, silicon dioxide and boron nitride. Composite materials (obtained by surface treatment of abrasive agents with other abrasive agents) composed of these abrasive agents may also be used. In some cases, these abrasive agents contain compounds or elements other than the above enumerated main components. However, the effect is unchanged as long as the above main components are contained in an amount of 90 mol % or more.

These abrasive materials are preferably 0.01 to 2 μm in particle size. However, abrasive agents which are different particle size may be combined with one another if desired, or the particle size distribution of a single abrasive agent may be broadened to obtain a similar effect. It is preferred that the abrasive agents have a tap density of 0.3 to 2 g/ml, a water content of 0.1 to 5%, a pH of 2 to 11 and a specific surface area of 1 to 30 m$^2$/g.

The shape of the abrasive agents used in the present invention may be any of acicular, spherical and die-like shapes, but a shape having a corner is preferable because of its high abrasive ability.

Specific examples of the abrasive agents used in the present invention include AKP-20, AKP-30, AKP-50 and HIT-50 (manufactured by Sumitomo Chemical Co., Ltd.); G5, G7 and S-1 (manufactured by Nippon Chemical Industrial Co., Ltd.); and 100ED and 140ED (manufactured by Toda Kogyo Co., Ltd.).

It is of course possible that the abrasive agents are appropriately used in the first magnetic layer and the second magnetic layer by changing the kind, amount and combination of the abrasive agents according to the purpose sought. For example, in order to improve the durability of the major surfaces of the magnetic layer structure, the amount of the abrasive agent contained in the second magnetic layer is increased, and in order to improve the durability of the edge surfaces of the magnetic layer structure, the amount of the abrasive agent contained in the first magnetic layer is increased.

These abrasive agents can be previously dispersed with the binders, followed by addition to magnetic coating compositions.

It is preferred that the major surfaces and the edge surfaces of the magnetic layer structure of the magnetic recording medium of the present invention contain at least 5 particles/100 $^2$ of abrasive agent.

In the present invention, additives having lubricating effect, antistatic effect, dispersing effect, plasticizing effect or the like can be used. Examples of such additives include molybdenum disulfide, tungsten disulfide, graphite, boron nitride, fluorinated graphite, silicone oil, silicones having polar groups, fatty acid-modified silicones, fluorine-containing silicones, fluorine-containing alcohols, fluorine-containing esters, polyolefins, polyglycols, alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monohydric, dihydric, trihydric, tetrahydric, pentahydric and hexahydric alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monohydric, dihydric, trihydric, tetrahydric, pentahydric and hexahydric alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms. Specific examples of these compounds include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

There can also be used nonionic surface active agents such as alkylene oxides, glycerin compounds, glycidol compounds and alkylphenol-ethylene oxide adducts; cationic surface active agents such as cyclic amines, ester amides, quaternary ammonium salts, hydantoin derivatives, heterocyclic compounds, phosphonium compounds and sulfonium compounds; anionic surface active agents containing acidic groups such as carboxyl groups, sulfonic acid groups, phosphoric acid groups, sulfate groups and phosphate groups; and amphoteric surface active agents such as amino acids, aminosulfonic acids, sulfates or phosphates of aminoalcohols and alkylbetaine-type compounds. These surface active agents are described in detail in "*Handbook of Surface Active Agents*" published by Sangyo Tosho Co., Ltd., Japan)

These lubricating agents and antistatic agents do not necessarily have a purity of 100%, and may contain impurities such as isomers, unreacted materials, by-products, decomposed products and oxidation products other than the main components. The amount of these impurities contained in the lubricating agents and antistatic agents is preferably 30 mol % or less, and more preferably 10 mol % or less.

It is possible that these lubricating agents and surface active agents are properly used in the first magnetic layer and the second magnetic layer by changing the kind and amount thereof if necessary. For example, the following methods are applicable in this regard.

(1) Fatty acids different in melting point are used in the first magnetic layer and the second magnetic layer, respectively, to control their bleeding to the surface.

(2) Esters different in boiling point or in polarity are used in the first magnetic layer and the second magnetic layer, respectively, to control their bleeding to the surface.

(3) The amount of the surface active agent is adjusted to improve the stability of coating.

(4) The amount of the lubricating agent to the magnetic substance is increased in the first magnetic layer to improve lubricating effect.

The use of the lubricating agents and the surface active agents is of course not limited to the examples shown above.

All or a part of the additives used in the present invention can be added in any step of the magnetic coating production. For example, they can be mixed with the magnetic substance before a kneading step, or can be added during the kneading step of the magnetic substance, the binder and the solvent, during a dispersing step, after the dispersing step, or just before a coating step.

Examples of commercial products which are representative of these lubricating agents include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil hardened fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, Butyl stearate, Butyl laurate and Erucic acid (manufactured by Nippon Oil and Fats Co., Ltd.); Oleic acid (manufactured by Kanto Kagaku Co., Ltd.); FAL-205 and FAL-123 (manufactured by Takemoto Yushi Co., Ltd.); Enujerubu LO, Enujerubu IPM and Sansosyzer E4030 (manufactured by Shin-Nippon Rika Co., Ltd.); TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shin-Etsu Chemical Co., Ltd.); Armide P, Armide C and Armoslip CP (manufactured by Lion Ahmer Co.); Duomine TDO (manufactured by Lion Corp.); BA-41G (manufactured by Nisshin Seiyu Co., Ltd.); and Profan 2012E, Newpole PE61, Ionet MS-400, Ionet MO-200, Ionet DL-200, Ionet DS-300, Ionet DS-1000 and Ionet DO-200 (manufactured by Sanyo Chemical Industries, Ltd.).

Organic solvents used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. These solvents may be used in any appropriate proportions.

These organic solvents do not necessarily have a purity of 100%, and may contain impurities such as isomers, unreacted materials, by-products, decomposed products, oxidation products and water other than the main components. The amount of these impurities contained in the solvents is preferably 30 mol % or less, and more preferably 10 mol % or less of the organic solvent.

The organic solvent used in the first magnetic layer may be different from that used in the second magnetic layer in kind and amount thereof. For example, the highly volatile solvent is used in the first magnetic layer to improve surface properties, the solvent having high surface tension (such as cyclohexane or dioxane) is used in the first magnetic layer to improve coating stability, or the solvent having a high solubility parameter is used in the second magnetic layer to increase the packing degree. The use of the solvents is of course not limited to these examples.

In the magnetic recording medium of the present invention, the thickness of the non-magnetic support is generally 1 to 100 $\mu$m, and preferably 5 to 20 $\mu$m. The ratio of the total thickness of magnetic layers provided on the support to that of the non-magnetic support is in the range of 0.01 to 2.

Also, an interlayer may be formed between the non-magnetic support and the first magnetic layer such as an undercoating layer for improvement in adhesion or a layer containing carbon black for prevention of electric charge. The thickness of the interlayer is generally 0.01 to 2 $\mu$m, and preferably 0.05 to 0.5 $\mu$m. A backing layer may be formed on the surface opposite to the magnetic layer side of the non-magnetic support. The thickness of the backing layer is generally 0.1 to 2 $\mu$m, and preferably 0.3 to 1.0 $\mu$m. As the interlayer and the backing layer, conventional materials can be used.

The non-magnetic supports used in the present invention include conventional films formed of polyesters such as polyethylene terephthalate and polyethylene naphthalate, polyolefins, cellulose triacetate, polycarbonates, polyamides, polyimides, polyamideimides or polysulfones. These supports may previously be subjected to corona discharge treatment, plasma treatment, adhesion treatment, heating treatment, dust removing treatment or the like. It is desirable to use the non-magnetic support having a center line average height (Ra) of generally not more than 0.03 $\mu$m, preferably not more than 0.02 $\mu$m, more preferably not more than 0.01 $\mu$m. The cut-off value is 0.25 mm. It is further preferable that the non-magnetic support not only is low in center line average height, but also has no large projections of 1 $\mu$m or more. The roughness and shape of the surface of the support are freely controlled by adjusting the size and amount of a filler added thereto, if desired. Examples of the fillers include finely divided organic substances such as acrylic compounds, in addition to oxides and carbonates of Ca, Si, Ti and the like. As to the non-magnetic support used in the present invention, the F-5 value in the running direction of the tape is preferably 5 to 50 kg/mm$^2$, and the F-5 value in the width direction of the tape is preferably 3 to 30 kg/mm$^2$. In general, the F-5 value in the running direction of the tape is higher than that in the width direction of the tape. When the strength in the width direction of the tape is particularly required to be increased, however, this arrangement does not apply.

Further, the heat shrinkage rate in the running and width directions of the tape at 100° C. for 30 minutes is preferably 3% or less, and more preferably 1.5% or less. The heat shrinkage rate at 80° C. for 30 minutes is preferably 1% or less, and more preferably 0.5% or less. The breaking strength in both directions of the tape is preferably 5 to 100 kg/mm$^2$, and the modulus is preferably 100 to 200 kg/mm$^2$.

The production process of the magnetic coating used for the magnetic recording medium of the present invention comprises at least a kneading step, a dispersing step and mixing steps added before and/or after these steps if desired. Each step can be divided into two or more stages.

All of the starting materials used in the present invention, such as the magnetic substances, the binders, the carbon black, the abrasive materials, the antistatic agents, the lubricating agents and the solvents, can be added at the start of or during any step. Each of the starting materials can also be added in parts over two or more steps. For example, polyurethane can be incorporated in parts variously in the kneading step, in the dispersing step and in the mixing step for adjustment of viscosity after the dispersing step.

In order to attain the objects of the present invention, production techniques known in the art can of course be used as a part of the process. In the kneading step, however, kneaders having strong kneading ability such as continuous kneaders and pressure kneaders are used, whereby the high residual magnetic flux density of the magnetic recording medium of the present invention can be obtained.

When the continuous kneader or the pressure kneader is used, all of the binders or a part thereof (30% or more of all of the binders is preferable) are kneaded with the magnetic substance within the range of 15 to 500 parts by weight per 100 parts by weight of the magnetic substance. The details of such kneading treatment are described in JP-A-1-106338 and JP-A-64-79274. In the magnetic recording medium of the present invention, the second magnetic layer has a thickness of 1.5 to 3 $\mu$m. However, the conventional successive multilayer coating method, in which the first magnetic layer is applied and then the second magnetic layer is applied thereon after drying the first magnetic layer, has a problem in respect to productivity. In particular, it is difficult to attain the desired second magnetic layer thickness because coating defects are liable to be formed in the second magnetic layer. Further, in the conventional successive multilayer coating methodology, the thermosetting binder component is not used in the first magnetic layer, and, as a result, the lower magnetic layer becomes appreciably swollen. For this reason, it is difficult to produce the magnetic recording medium of the present invention by way of the above-mentioned conventional coating technic. In the present invention, however, this problem has been solved by using the simultaneous multilayer coating method as described in U.S. Pat. No. 4,844,946.

In order to obtain the SFD of the second magnetic layer specified in the present invention, it is necessary to highly orient the magnetic substance. It is preferred to use a solenoid of at least 1,000 G in combination with a cobalt magnet of at least 2,000 G, and it is further preferred provide a suitable drying step before orientation so as to give the highest orientation after drying.

A calender roll is formed of a heat-resistant resin such as an epoxy resin, a polyimide, a polyamide or a polyimideamide. The treating temperature is preferably 60° C. or more, and more preferably 80° C. or more. The line pressure is preferably 200 kg/cm or more, and more preferably 300 kg/cm or more.

The coefficient of friction against a pole made of stainless steel (SUS 420J) of the magnetic layer surface of the magnetic recording medium of the present invention and of the opposite surface thereof is preferably 0.5 or less, and more preferably 0.3 or less. The surface resistivity is preferably $1 \times 10^5$ to $1 \times 10^{12}$ ohms/square, and the modulus of the magnetic layer at 0.5% elongation in both the running and width directions of the tape is preferably 100 to 2,000 kg/mm$^2$. The breaking strength is preferably 1 to 30 kg/cm$^2$. The modulus of the magnetic recording medium in both the running and width directions is preferably 100 to 1,500 kg/mm$^2$, and the residual elongation thereof is preferably 0.5% or less. The heat shrinkage rate at all temperatures of at least 100° C. is preferably 1% or less, more preferably 0.5% or less, and further more preferably 0.1% or less.

The amount of the residual solvents contained in the magnetic layers is preferably 100 mg/m$^2$ or less, and more preferably 10 mg/m$^2$ or less. It is preferred that the amount of the residual solvent contained in the second magnetic layer is less than that of the residual solvent contained in the first magnetic layer.

The percentage of voids in both of the first magnetic layer and the second magnetic layer is preferably 30% by volume or less, and more preferably 10% by volume or less. It is preferred that the percentage of voids in the first magnetic layer is higher than that found in the second magnetic layer. However, the percentage of voids in the first magnetic layer may be lower than that in the second magnetic layer, if the percentage of voids in the first magnetic layer is 5% or more.

As explained above, the magnetic recording medium of the present invention has a first magnetic layer and a second magnetic layer. It is understood that their physical characteristics can be varied between the first magnetic layer and the second magnetic layer depending on the purpose(s) sought. For example, the modulus of the second magnetic layer is increased to improve the running durability, and at the same time, the modulus of the first magnetic layer is lowered compared with that of the second magnetic layer in order to improve the contact of the magnetic recording medium with a head.

The present invention will be described in more detail with reference to the following examples but the present invention is not to be construed as limited thereto.

In the following examples, all parts are by weight.

EXAMPLE

Magnetic coating compositions having the following formulations were prepared:

| Coating Composition for First Magnetic Layer | |
|---|---|
| Cobalt-containing iron oxide (specific surface area measured by the BET method: 26 m$^2$/g, average major axis: 0.35 μm, crystallite size: 450 Å) | 100 parts |
| Vinyl chloride-vinyl acetate-vinyl alcohol copolymer (composition ratio: 91:3:6 by weight, polymerization degree: 400, hydroxyl group content: 1.3 × 10$^{-3}$ eq/g) | 10 parts |
| Polyester polyurethane resin (composition: HD, AA, MOI) | 10 parts |
| α-Al$_2$O$_3$ (average particle size: 0.5 μm) | 1 part |
| Lauric acid | 1 part |
| Myristic acid-modified silicone | 1 part |
| Butyl acetate | 200 parts |
| Coating Composition for Second Magnetic Layer | |
| Cobalt-containing iron oxide (specific surface area measured by the BET method: 45 m$^2$/g, average major axis: 0.25 μm, crystallite size: 310 Å) | 100 parts |
| Vinyl chloride-vinyl acetate-vinyl alcohol copolymer (composition ratio: 86:13:1 by weight, polymerization degree: 400) | 15 parts |
| Polyester polyurethane resin (containing 10$^{-4}$ mol/g of carboxyl groups) | 5 parts |
| α-Al$_2$O$_3$ (average particle size: 0.5 μm) | 3 parts |
| Carbon black (particle size: 0.28 μm) | 3 parts |
| Lauric acid | 1 part |
| Oleic acid-modified silicone | 1 part |
| Butyl acetate | 200 parts |

With respect to each of the two coating compositions described above, the components were kneaded with a continuous kneader, and then dispersed by using a sand mill. 6 parts of a polyisocyanate was added to the coating composition for the second magnetic layer. 40 parts of butyl acetate was added to each of the resulting dispersions, followed by filtration using a filter having an average pore size of 1 μm to prepare a coating solution for each of the first magnetic layer and the second magnetic layer.

The resulting coating solution for the first magnetic layer was applied to the surface of a 7.1 μm-thick polyethylene terephthalate support having a center line average height of 0.02 μm so as to form a first magnetic layer having a thickness of 3.3 μm after drying for purposes of the tests summarized in FIGS. 1–4. Immediately thereafter while the first magnetic layer has not completely dried, the coating solution for the second magnetic layer was successively applied thereto so as to form a second magnetic layer ultimately having a thickness of 1.7 μm after drying for purposes of the tests summarized in FIGS. 1–4. Orientation was thereafter conducted by a cobalt magnet having a magnetic force of 3,000 G and a solenoid having a magnetic force of 1,500 G while both the magnetic layers were still in a wet condition. After drying, calender treatment was conducted at a temperature of 90° C., followed by slitting to a width of 3.8 mm to produce an audio tape.

The coercive force of each magnetic layer was adjusted to a desired value by varying the coercive force of the magnetic substance. The residual magnetic flux density of each magnetic layer was adjusted to a desired value by varying the kneading conditions of the continuous kneader and the pressure conditions of the calender.

The resulting audio tapes were evaluated by the following methods. The characteristics evaluated for examples and comparative examples are shown in FIGS. 1 to 5.

Evaluating Methods

Each of the MOL 315 and the MOL 10 k at the high position was measured by using a commercial tape deck for measurement (Type 582 manufactured by Nakamichi Co., Ltd.).

MOL315

The maximum output was examined when the tertiary higher harmonic of a 315 Hz signal reached 3%. The values shown in the figures are relative values when the MOL 315 of audio tape PS-IIX:C-90 (manufactured by Fuji Photo Film Co., Ltd.) is taken as a benchmark value of 0 dB.

MOL 10 k

The saturated output of a 10 k Hz signal was examined. The values shown in the figures are relative values when the MOL 10 k of audio tape PS-IIX:C-90 (manufactured by Fuji Photo Film Co., Ltd.) is taken as a benchmark value of 0 dB.

Figure 1:
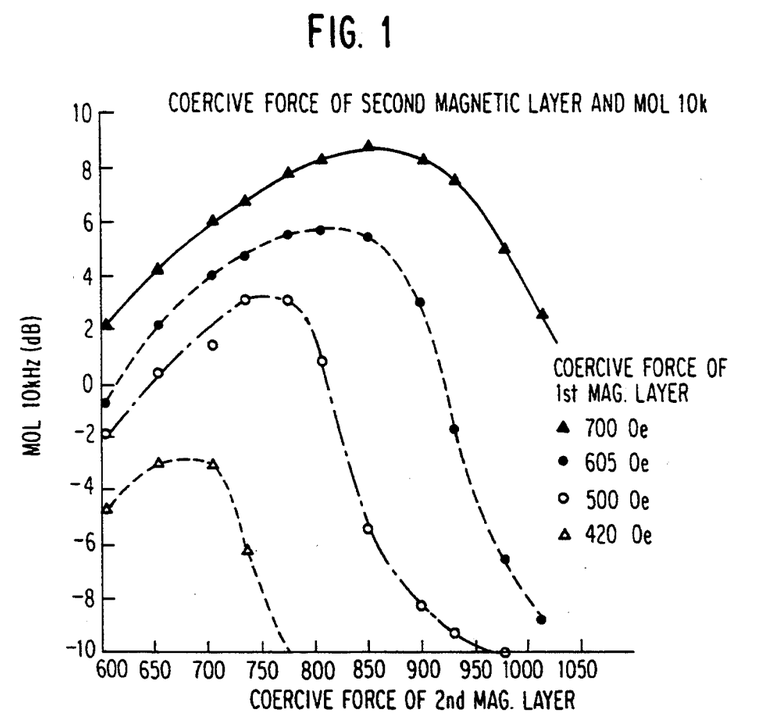
FIG. 1 is a graph showing the relationship among the coercive force of a first magnetic layer, the coercive force of a second magnetic layer and the MOL 10k.

FIG. 1 is a graph showing the relationship among the coercive force of the first magnetic layer, the coercive force of the second magnetic layer and the MOL 10 k. In this case, the residual magnetic flux density of the first magnetic layer was 2,100 gausses, the residual magnetic flux density of the second magnetic layer was 1,600 gausses, the thickness of the first magnetic layer was 3.3 μm, and the thickness of the second magnetic layer was 1.7 μm.

Figure 2:
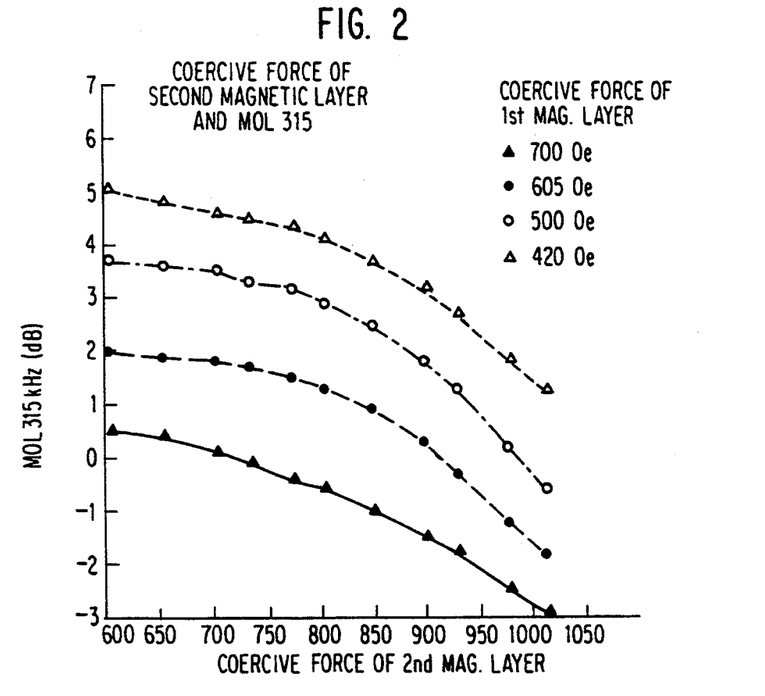
FIG. 2 is a graph showing the relationship among the coercive force of a first magnetic layer, the coercive force of a second magnetic layer and the MOL 315.

FIG. 2 is a graph showing the relationship among the coercive force of the first magnetic layer, the coercive force of the second magnetic layer and the MOL 315. The test samples used herein had the same characteristics as those examined and summarized in FIG. 1.

Figure 3:
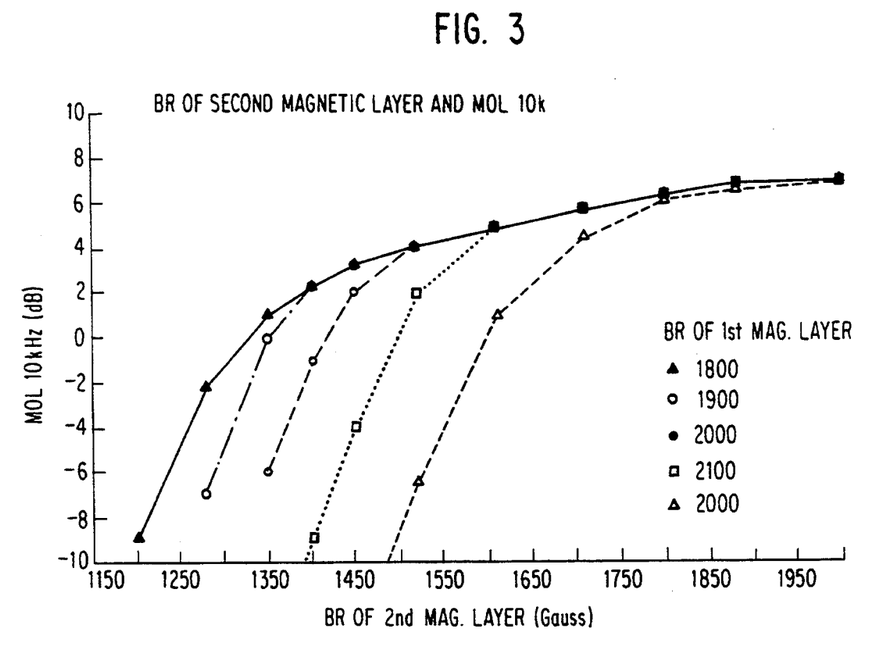
FIG. 3 is a graph showing the relationship among the residual magnetic flux density of the first magnetic layer, the residual magnetic flux density of the second magnetic layer and the MOL 10 k.

FIG. 3 is a graph showing the relationship among the residual magnetic flux density of the first magnetic layer, the residual magnetic flux density of the second magnetic layer and the MOL 10 k. The samples used herein had a coercive force of 550 Oe and a thickness of 3.3 μm in the first magnetic layer, and a coercive force of 750 Oe and the thickness of 1.7 μm in the second magnetic layer.

Figure 4:
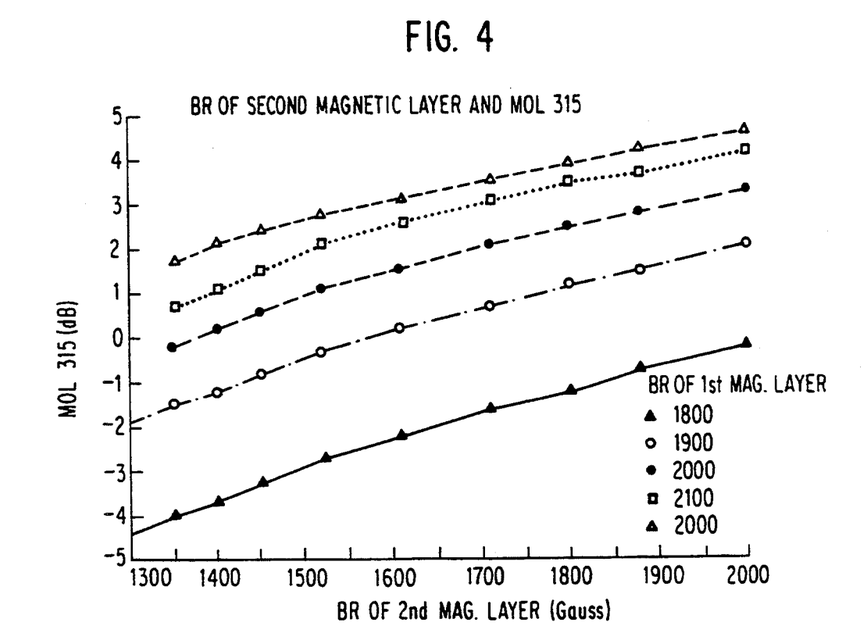
FIG. 4 is a graph showing the relationship among the residual magnetic flux density of the first magnetic layer, the residual magnetic flux density of the second magnetic layer and the MOL 315.

FIG. 4 is a graph showing the relationship among the residual magnetic flux density of the first magnetic layer, the residual magnetic flux density of the second magnetic layer and the MOL 315. The samples used herein had a coercive force of 550 Oe and a residual magnetic flux density of 2,100 gausses in the first magnetic layer, and a coercive force of 750 Oe and a residual magnetic flux density of 1,600 gausses in the second magnetic layer. The thicknesses of the first and second magnetic layers were 3.3 μm and 1.7 μm, respectively.

FIG. 5 is a graph showing the relationship between the thickness of the second magnetic layer and the MOL 10 k. The samples used herein had the same characteristics as those studies and summarized in FIG. 4, except that the thickness of the first magnetic layer was changed such that the total thickness of the first and second magnetic layers was 5 μm.

The results shown in FIG. 1 reveal that the MOL 10 k decreases with a decrease in total coercive force, and that the MOL 10 k decreases if the difference in coercive force between the second magnetic layer and the first magnetic layer is too large or too small.

The results shown in FIG. 2 reveal that the MOL 315 decreases if the total coercive force increases too highly.

The results shown in FIG. 3 reveal that the MOL 10 k decreases if the difference in residual magnetic flux density between the second magnetic layer and the first magnetic layer increases too highly.

The results shown in FIG. 4 reveal that the MOL 315 decreases with a decrease in total residual magnetic flux density of the magnetic layer structure.

The results shown in FIG. 5 reveal that the MOL 10 k rapidly deteriorates if the thickness of the second magnetic layer is too thin.

It is considered to be for the following reason that the MOL 10 k decreases when the difference in coercive force between the second magnetic layer and the first magnetic layer is too large. Namely, when the coercive force of the second magnetic layer is higher than that of the first magnetic layer, the second magnetic layer differs from the first magnetic layer in a region magnetized by lines of magnetic force supplied from a recording head. For this reason, it is inferred that a signal recorded on the second magnetic layer and a signal recorded on the first magnetic layer counteract each other in a high frequency region of 10 kHz or more in a reproducing procedure.

While the invention has been described in detail and with reference to specific embodiments thereof, it will be apparent to one skilled in the art that various changes and modifications can be made therein without departing from the spirit and thereof.

What is claimed is:

1. A magnetic recording medium comprising a non-magnetic support and at least two magnetic layers formed thereon, each of which is mainly composed of a magnetic substance and a binder, said at least two magnetic layers comprise a first magnetic layer which is a lower layer and has a coercive force of 450 to 660 Oe, a residual magnetic flux density (Br) of 1,950 gausses or more and a thickness of 1.5 to 5 μm, and a second magnetic layer which is an upper layer and has a coercive force of 700 to 900 Oe, a residual magnetic flux density of 1,500 gausses or more and a thickness of 1.5 to 3 μm, and the difference in coercive force between the first magnetic layer and the second magnetic layer is 150 to less than 300 Oe, and the difference in residual magnetic flux density between the first magnetic layer and the second magnetic layer is within 600 gausses, and the total thickness of magnetic layers on the non-magnetic support is 3 to 7 μm.

2. A magnetic recording medium as in claim 1, wherein said first magnetic layer contains carbon black having a primary particle size of at least 20 μm and volatiles of 10% by weight or less in an amount of 1 to 20 parts by weight per 100 parts by weight of magnetic substance in the first magnetic layer.

3. A magnetic recording medium as in claim 1, wherein said first magnetic layer does not contain carbon black.

4. A magnetic recording medium as in claim 1, wherein said first magnetic layer has a thickness 1.5 to 5 μm and the second magnetic layer has a thickness of from 1.5 to 3 μm.

5. A magnetic recording medium as in claim 1, wherein magnetic substance contained in the first magnetic layer has a specific surface area of 40 m$^2$/g or less measured by BET method and a crystallite size of 210 Å or more, and magnetic substance contained in the second magnetic layer has a specific surface area of 35 m$^2$/g or more measured by the BET method and a crystallite size of 350 Å or less.

6. A magnetic recording medium as in claim 1, wherein magnetic substance contained in the first magnetic layer has a specific surface area of 35 m$^2$/g or less and a crystallite size of 250 Å or more and magnetic substance contained in the second magnetic layer has a specific surface area of 40 m$^2$/g or more and a crystallite size of 210 Å or more.

7. A magnetic recording medium as in claim 1, wherein magnetic layer is applied over the first magnetic layer which is still in a wet state.

8. A magnetic recording medium as in claim 1, wherein saturation magnetization ($\sigma$s) of magnetic substance contained in the second magnetic layer is 50 emu/g or more and saturation magnetization ($\sigma$s) of magnetic substance contained in the first magnetic layer is 50 emu/g or more.

9. A magnetic recording medium as in claim 1, wherein tap density of magnetic substance contained in the second magnetic layer is 0.5 g/ml or more and tap density of magnetic substance contained in the first magnetic layer is 0.6 g/ml or more.

10. A magnetic recording medium as in claim 1, wherein magnetic substances contained in said first magnetic layer and said second magnetic layer are selected from the group consisting of $\gamma$-FeO$_x$ (x=1.33 to 1.5), Co-containing $\gamma$-FeO$_x$ (x=1.33 to 1.5), a finely divided ferromagnetic alloy mainly containing at least 75 atomic % of Fe, Ni or Co, barium ferrite and strontium ferrite.

11. A magnetic recording medium as in claim 1, wherein said magnetic substance is a Co-containing iron oxide.

12. A magnetic recording medium as in claim 1, wherein said binder contains at least one polar group selected from the group consisting of —COOM, —SO$_3$M, —OSO$_3$M, —P=O(OM)$_2$, —O—P=O(OM)$_2$ (wherein M represents a hydrogen atom, an alkali metal or ammonium), —OH, —NR$_2$, —NR$_3$ (wherein R represents a hydrocarbon group), an epoxy group, —SH and —CN group.

13. A magnetic recording medium as in claim 1, wherein the amount of polar group is $1 \times 10^{-2}$ to $1 \times 10^{-6}$ mol/g binder.

14. A magnetic recording medium as in claim 1, wherein said first magnetic layer is formed using a continuous kneader.

* * * * *